(12) United States Patent
Xiao (10) Patent No.: US 11,381,385 B2
(45) Date of Patent: Jul. 5, 2022

(54) DATA PROCESSING METHOD AND APPARATUS FOR BLOCKCHAIN, AND STORAGE MEDIUM

(71) Applicant: BAIDU ONLINE NETWORK TECHNOLOGY (BEIJING) CO., LTD., Beijing (CN)

(72) Inventor: Wei Xiao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 146 days.

(21) Appl. No.: 16/768,440

(22) PCT Filed: May 20, 2019

(86) PCT No.: PCT/CN2019/087577
§ 371 (c)(1),
(2) Date: May 29, 2020

(87) PCT Pub. No.: WO2020/057158
PCT Pub. Date: Mar. 26, 2020

(65) Prior Publication Data
US 2020/0389291 A1 Dec. 10, 2020

(30) Foreign Application Priority Data
Sep. 18, 2018 (CN) .......................... 201811089389.6

(51) Int. Cl.
*H04L 9/40* (2022.01)
*H04L 9/06* (2006.01)
(Continued)

(52) U.S. Cl.
CPC .......... *H04L 9/0637* (2013.01); *H04L 9/3247* (2013.01); *H04L 67/1044* (2013.01); *H04L 9/50* (2022.05)

(58) Field of Classification Search
CPC . H04L 9/0637; H04L 9/3247; H04L 67/1044; H04L 2209/38
See application file for complete search history.

(56) References Cited

U.S. PATENT DOCUMENTS 9,208,836 B1 * 12/2015 Ware .................... G11C 7/1012
9,948,467 B2    4/2018 King
(Continued)

FOREIGN PATENT DOCUMENTS

CN    106844477 A    6/2017
CN    108023896 A    5/2018
(Continued)

OTHER PUBLICATIONS

Office Action for Chinese Application No. 201811089389.6, dated Jun. 15, 2020, 19 pages total.
(Continued)

*Primary Examiner* — Ghodrat Jamshidi
(74) *Attorney, Agent, or Firm* — Fay Sharpe LLP (57) ABSTRACT

Disclosed are a data processing method and apparatus for a blockchain, and a medium. The data processing method for the blockchain is applied to a blockchain node. The method includes: obtaining a transaction request for creating a synchronizing group; based on the transaction request for creating the synchronizing group, determining one or more sequential blocks from a first block to a current block as one or more synchronizing blocks of the synchronizing group; determining a synchronizing signature of the synchronizing group based on the one or more synchronizing blocks; and recording the synchronizing signature as transaction data in the current block.

10 Claims, 6 Drawing Sheets

(51) Int. Cl.
*H04L 9/32* (2006.01)
*H04L 67/104* (2022.01)
*H04L 9/00* (2022.01)

(56) References Cited

U.S. PATENT DOCUMENTS

| | | | |
|---|---|---|---|
| 11,139,972 B2 * | 10/2021 | Watanabe | H04L 9/321 |
| 2016/0342994 A1 * | 11/2016 | Davis | G06Q 20/027 |
| 2016/0358164 A1 * | 12/2016 | Liao | G06Q 20/0655 |
| 2018/0019867 A1 * | 1/2018 | Davis | H04L 9/3239 |
| 2018/0115413 A1 | 4/2018 | King | |
| 2018/0181953 A1 * | 6/2018 | Lacoss-Arnold | H04L 9/0869 |
| 2018/0241551 A1 * | 8/2018 | Fujimura | H04L 63/061 |
| 2019/0044714 A1 * | 2/2019 | Parker | G06F 16/27 |
| 2019/0149321 A1 * | 5/2019 | Androulaki | H04L 9/3239 380/28 |
| 2019/0342078 A1 * | 11/2019 | Li | G06F 16/22 |
| 2020/0007558 A1 * | 1/2020 | Inokuchi | H04L 63/0876 |
| 2020/0234386 A1 * | 7/2020 | Blackman | H04L 9/14 |
| 2021/0152365 A1 * | 5/2021 | Nosseir | H04L 9/3239 |

FOREIGN PATENT DOCUMENTS

| | | |
|---|---|---|
| CN | 108234134 A | 6/2018 |
| CN | 108241743 A | 7/2018 |
| CN | 108370318 A | 8/2018 |
| CN | 109361734 A | 2/2019 |
| KR | 20180037851 A | 4/2018 |
| KR | 20180086679 A | 8/2018 |

OTHER PUBLICATIONS

Office Action for Chinese Application No. 201811089389.6, 17 pages total.
ISR for PCT Application No. PCT/CN2019/087577, 19 pages total.

* cited by examiner

DATA PROCESSING METHOD AND APPARATUS FOR BLOCKCHAIN, AND STORAGE MEDIUM

CROSS-REFERENCE TO RELATED APPLICATIONS

This application is a US national phase application of International Application No. PCT/CN2019/087577, filed on May 20, 2019, which is based upon and claims priority to Chinese Patent Application No. 201811089389.6, filed on Sep. 18, 2018, the entire contents of which are incorporated herein by reference.

FIELD

Embodiments of the present disclosure relate to blockchain technologies, and more particularly to a data processing method and apparatus for a blockchain, and a non-transitory computer-readable storage medium.

BACKGROUND

A blockchain is a new application mode of a computer technology such as distributed data storage, a point-to-point transmission, a consensus mechanism, an encryption algorithm.

In an existing blockchain technology, when a certain node needs to synchronously obtain blockchain data from other nodes, multiple verifications need to be performed on received data to determine validity, legality and data correctness of a block. A verification procedure needs to occupy processing resources of a large amount of processors, and takes a long time.

SUMMARY

Embodiments of the present disclosure provide a data processing method and apparatus for a blockchain, and a medium.

Embodiments of the present disclosure provide a data processing method for a blockchain, and the method is applied to nodes of the blockchain. The method includes: obtaining a transaction request for creating a synchronizing group; based on the transaction request for creating the synchronizing group, determining one or more sequential blocks from a first block to a current block as one or more synchronizing blocks of the synchronizing group; determining a synchronizing signature of the synchronizing group based on the one or more synchronizing blocks; and recording the synchronizing signature as transaction data in the current block.

Embodiments of the present disclosure provide a data processing apparatus for a blockchain, and the apparatus is configured in nodes of the blockchain. The apparatus includes: one or more processors; a memory storing instructions executable by the one or more processors; in which the one or more processors are configured to: obtain a transaction request for creating a synchronizing group; based on the transaction request for creating the synchronizing group, determine one or more sequential blocks from a first block to a current block as one or more synchronizing blocks of the synchronizing group; determine a synchronizing signature of the synchronizing group based on the one or more synchronizing blocks; and record the synchronizing signature as transaction data in the current block.

Embodiments of the present disclosure also provide a medium having a computer program stored thereon. The computer program is configured to implement a data processing method for the blockchain, and the method includes: obtaining a transaction request for creating a synchronizing group; based on the transaction request for creating the synchronizing group, determining one or more sequential blocks from a first block to a current block as one or more synchronizing blocks of the synchronizing group; determining a synchronizing signature of the synchronizing group based on the one or more synchronizing blocks; and recording the synchronizing signature as transaction data in the current block.

Other aspects may be understood after accompanying drawings and detailed description are read and understood.

BRIEF DESCRIPTION OF THE DRAWINGS

In order to more clearly describe technical solutions of embodiments of the present disclosure, brief introduction will be made below to accompanying drawings needing to be used in the embodiments. It should be understood that, the accompanying drawings merely illustrate some embodiments of the present disclosure, and should not be considered as limiting the scope. For those skilled in the art, other relevant accompanying drawings may be obtained according to these accompanying drawings without paying any creative labor.

DETAILED DESCRIPTION

Detailed description will be further made below to the present disclosure with reference to the accompanying drawings and the embodiments. It should be understood that, the embodiments described herein are intended only to explain the present disclosure, and are not intended to limit the present disclosure. In addition, it also should be noted that, for convenience of description, the accompanying drawings merely illustrate some but not all of the contents related to the present disclosure.

Embodiment 1

Figure 1:
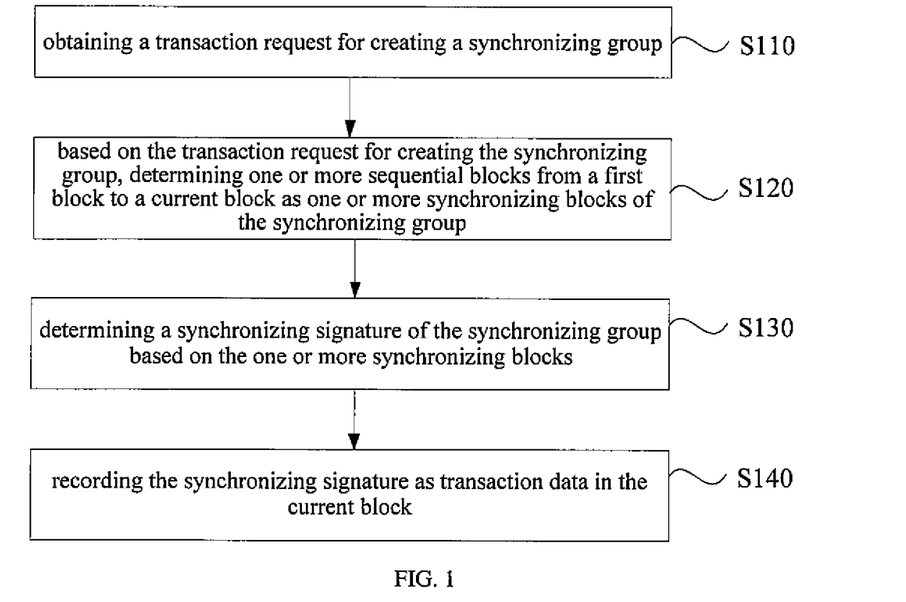
FIG. 1 is a flow chart illustrating a data processing method for a blockchain provided in Embodiment 1 of the present disclosure.

FIG. 1 is a flow chart illustrating a data processing method for a blockchain provided in Embodiment 1 of the present disclosure. This embodiment may be applicable to data processing in a blockchain network, for example, may be applicable to a case where a certain node needs to synchronously obtain blockchain data from other nodes in the blockchain network. An applicable blockchain may be a public chain, a private chain or an alliance chain. The method of this embodiment may be applied to a node of the blockchain. The method may be executed by a data processing apparatus for a blockchain. The apparatus may be implemented in form of software and/or hardware, and integrated in a computing device carrying the node of the blockchain. Referring to FIG. 1, the method includes the followings.

At step S110, a transaction request for creating a synchronizing group is obtained.

The synchronizing group includes one or more blocks. The transaction request for creating the synchronizing group refers to a transaction request used for creating the synchronizing group. Alternatively, the transaction request for creating the synchronizing group may include information such as a block marker of each block required by the synchronizing group, a position of a synchronizing point required by the synchronizing group, a signature way of the synchronizing group or a marker of the synchronizing group. In this embodiment, the transaction request for creating the synchronizing group may also be a creation instruction for creating the synchronizing group, and be used to indicate to set the synchronizing point at a position of a current block to create the synchronizing group.

The synchronizing point may generally refer to an end position of the synchronizing group, and a start position of the synchronizing group may be set by default. For example, each synchronizing group starts from a previous synchronizing point or starts from the 0th block by default. A local node may receive transaction requests for creating the synchronizing group initiated by other nodes in the blockchain network, or may initiate the transaction request for creating the synchronizing group in local.

It should be noted that, the local node may be a node generated by the current block or other node of the blockchain. Ways for obtaining the transaction request for creating the synchronizing group are depending on whether the local node is generated by the current block. In detail, when the local node is the node generated by the current block, the transaction request for creating the synchronizing group may be obtained by: 1) receiving the transaction request for creating the synchronizing group initiated by any node in the blockchain network in real time; 2) initiating the transaction request for creating the synchronizing group locally when the local node detects that a current state of the blockchain satisfies a rule for creating synchronizing groups in local disposition data or a historical block; and 3) initiating the transaction request for creating the synchronizing group locally when the local node needs the synchronizing group to synchronize block data.

Correspondingly, when the local node is another node of the blockchain, the transaction request for creating the synchronizing group may be obtained by: 1) receiving the transaction request for creating the synchronizing group initiated by any node in the blockchain network in real time; 2) receiving the transaction request for creating the synchronizing group initiated by the node generated by the current block; and 3) initiating the transaction, request for creating the synchronizing group locally when the local node needs the synchronizing group to synchronize the block data.

In order to ensure the safety and reliability of the block data, exemplarily, after the transaction request for creating the synchronizing group is obtained, the method may also include: employing a public key with a control permission to verify an identity of a creator of the transaction request for creating the synchronizing group.

It should be noted that, in order to further control a permission for initiating the creation for the synchronizing group, a node that sets the permission may be controlled to initiate the creation for the synchronizing group, for example, to initiate the creation for the synchronizing group by a central node. The central node in the blockchain has the control permission, and uses a private key with the control permission to encrypt a part of the transaction request for creating the synchronizing group to indicate the identity. Therefore, after the transaction request for creating the synchronizing group is obtained, the local node may decrypt at least part of contents including an identity marker of the creator in the transaction request for creating the synchronizing group by using the public key with the control permission. Subsequently, the decrypted identity marker of the creator may be sent to a set verification node for verifying, or the decrypted identity marker of the creator may be matched with a pre-stored identity marker for verifying. Each node in the blockchain may locally maintain a list that stores the identity marker of each node. The identity marker may be a node marker or a network IP (Internet Protocol) address.

At step S120, based on the transaction request for creating the synchronizing group, one or more sequential blocks from a first block to a current block are determined as one or more synchronizing blocks of the synchronizing group.

The synchronizing block is one or more blocks constituting the synchronizing group. The first block may be the 0th block in the blockchain, i.e. a genesis block. The current block refers to the block currently being generated in the blockchain network, and is a latest block generated in the blockchain network. The number of synchronizing blocks in the synchronizing group may be one, for example, the first block and the current block are the same block; or may be more.

It should be noted that, the current block is constantly updated with an operation of the blockchain network, so the synchronizing blocks between different synchronizing groups overlap. For example, when the current block is the 10th block, then the synchronizing group is from the 0th block to the 10th block in the blockchain. If the creation for the synchronizing group is initiated when the current block is the 20th block, the synchronizing group is from 0th block to the 20th block. In this embodiment, the synchronizing point is set at the position of the current block by default, and taken as an end block of the synchronizing group, and the first block is the 0th block by default.

In detail, the local node may determine the current block as the end block of the synchronizing group based on the position of the synchronizing point included in the transaction request for creating the synchronizing group, and take a sequential block from the 0th block to the current block in the blockchain as the synchronizing block of the synchronizing group. The local node may also locate the current block based on the block identifier included in the transaction request for creating the synchronizing group, and take the sequential block from the 0th block to the current block in the blockchain as the synchronizing block of the synchronizing group. If the transaction request for creating the synchronizing group is the creation instruction, the local node directly sets the synchronizing point at the position of the current block after obtaining the transaction request for creating the synchronizing group, and determines the sequential block from the 0th block to the position of the synchronizing point as the synchronizing block of the synchronizing group.

At step S130, a synchronizing signature of the synchronizing group is determined based on the one or more synchronizing blocks.

The synchronizing signature refers to a marker used to uniquely identify or determine a certain synchronizing group, and may be used to represent information of the one or more synchronizing blocks included in the synchronizing group. Alternatively, a way for the synchronizing signature of the synchronizing group may be a signature way specified in the transaction request for creating the synchronizing group, a signature way stipulated by the blockchain network, or a signature way determined by the local node using its own public key, private key or signature algorithm such as SHA256, etc.

In detail, different signature ways determine different verification degrees for the block data. In following embodiments, detail introduction will be made to implementation solutions of different signature ways determining the synchronizing signature of the synchronizing group. For example, the synchronizing signature of the synchronizing group may be obtained by hash signature based on the block marker of each synchronizing block in the synchronizing group.

It should be noted that, with this embodiment, the synchronizing signature of the synchronizing group is determined based on the one or more synchronizing blocks, which indirectly indicates a correlation among the synchronizing block, the synchronizing group and the synchronizing signature, and brings convenience to subsequently query the synchronizing group.

At step S140, the synchronizing signature as transaction data is recorded in the current block.

In order to reduce a probability that the local node falsifies the synchronizing signature of the synchronizing group, the synchronizing signature may be as the transaction data to be stored in the block after the synchronizing signature of the synchronizing group is determined based on the one or more synchronizing blocks.

Alternatively, recording the synchronizing signature as the transaction data in the current block includes: recording the synchronizing signature as the transaction data in the current block based on the node generated by the current block; and sending the current block to other nodes for verification.

In detail, when the local node is the node generated by the current block, after the synchronizing signature of the synchronizing group is determined based on the one or more synchronizing blocks, the local node directly records the synchronizing signature of the synchronizing group as the transaction data in the current block, and sends the current block to other nodes in the blockchain for verification. After the current block sent by the local node is received, other nodes may process the transaction request for creating the synchronizing group, and calculate the synchronizing signature of the synchronizing group in the same way as the local node. When the calculated synchronizing signature is consistent with the synchronizing signature in the current block, the current block is confirmed to be valid, and the current block is stored in the blockchain; otherwise, block failure information including the marker of the current block is sent to other nodes in the blockchain.

After the synchronizing signature as the transaction data is recorded in the current block, when any node in the blockchain wants to synchronize the blockchain, the synchronizing signature may be verified. After the verification for the synchronizing signature is passed, synchronization is performed in a unit of the synchronizing group, thereby accelerating a data synchronizing rate.

It should be noted that, since the synchronizing group is constructed from the 0th block to the current block in this embodiment, the one or more synchronizing blocks of each newly constructed synchronizing group may cover synchronizing blocks of all the previously constructed synchronizing groups. Therefore, when the synchronizing signature of a latest synchronizing group is stored in the block, the synchronizing signature of the previously stored synchronizing group in the blockchain may be invalidated by default. When a synchronized blockchain needs to be downloaded, the synchronizing signature corresponding to the latest synchronizing group may be quickly queried by traversing from back to forth in the blockchain without recognizing all the blocks, thereby reducing the time for obtaining the synchronizing signature of the synchronizing group. In addition, in this embodiment, the synchronizing group established from the first block is more suitable for a newly added node in the blockchain network to download the synchronized blockchain. Only the synchronizing signature of the synchronizing group needs to be verified once, and all the blocks in the synchronizing group do not need to be verified, thereby simplifying a verification procedure. When a block segment from the 0 block to a certain position in the blockchain needs to be downloaded synchronously, a closest synchronizing signature to which the block segment belongs may be queried for use.

With the technical solution provided in embodiments of the present disclosure, after the transaction request for creating the synchronizing group is obtained, the synchronizing group from the first block to the current block is constructed based on the transaction request for creating the synchronizing group, which is more suitable for the newly added node in the blockchain network to download the synchronizing blockchain. The synchronizing signature of the synchronizing group is determined based on the one or more synchronizing blocks constructing the current synchronizing group, and the synchronizing signature as transaction data is recorded in the current block, thereby reducing the probability that the synchronizing signature is falsified. When any node in the blockchain wants to obtain the block data, the block data may be verified by taking the synchronizing group as a unit, which provides a new idea for the node in the blockchain to verify the blockchain data, and optimizes the verification method for the block data. When the method is performed in a scene for synchronizing the block data, a plurality of synchronizing blocks may be verified at one time, thereby accelerating data synchronizing.

Embodiment 2

Figure 2:
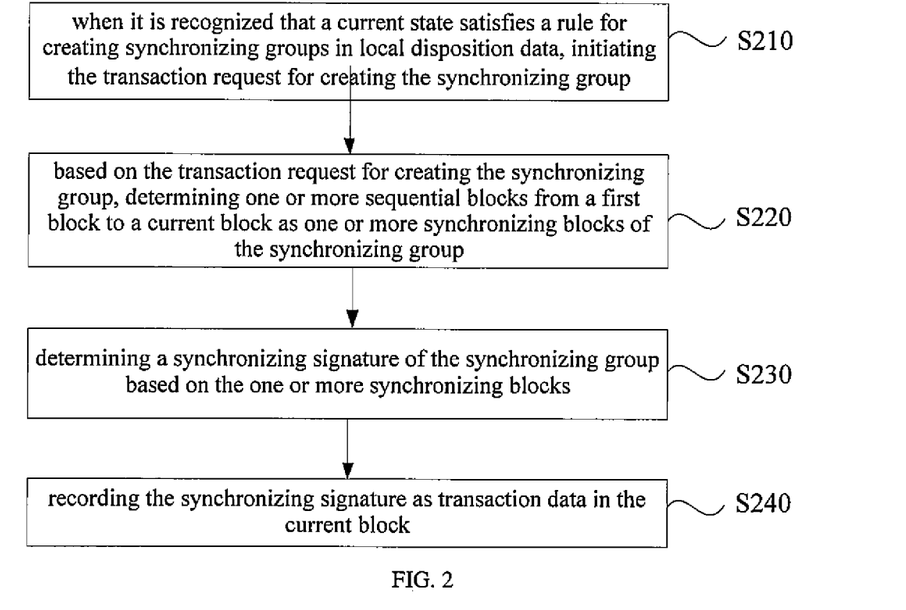
FIG. 2 is a flow chart illustrating a data processing method for a blockchain provided in Embodiment 2 of the present disclosure.

FIG. 2 is a flow chart illustrating a data processing method for a blockchain provided in Embodiment 2 of the present disclosure. This embodiment provides a way for obtaining a transaction request for creating a synchronizing group on the basis of the above embodiment. This embodiment creates the synchronizing group based on disposition data of a node of the blockchain. Referring to FIG. 2, the method includes the followings.

At step S210, when it is recognized that a current state satisfies a rule for creating synchronizing groups in local disposition data, the transaction request for creating the synchronizing group is initiated.

The current state refers to a current state of the blockchain network, and may include at least one of a current time and a current block height. The current time refers to a current local time of a local node. A block height is a serial number of the current block in the blockchain. The current block height refers to a current number of blocks in the blockchain network. The local disposition data refers to an operation rule of the blockchain network disposed locally when the local node participates in the blockchain network. The local disposition data may include the rule for creating the synchronizing groups, an issuance mechanism, a reward and punishment mechanism, etc. It should be noted that, the local disposition data may be stored locally on the local node, or also stored in a genesis block, i.e. the 0th block in the blockchain. Moreover, the local disposition data may also be submitted to the blockchain network in the form of a smart contract and stored in a certain block, and the rule for creating the synchronizing groups in the local disposition data may be executed regularly.

The rule for creating the synchronizing groups refers to a condition required to create the synchronizing groups. Alternatively, the rule for creating the synchronizing groups may include at least one of: 1) the current time satisfying a preset time value; and 2) the current block height satisfying a preset interval of block heights. The preset time value refers to a preset fixed time point or a preset fixed time period for creating the synchronizing groups. For example, the synchronizing group is created every 10 minutes, or the synchronizing group is created every entire time point. The preset interval of block heights refers to a preset period of the block heights for creating the synchronizing groups. For example, a new synchronizing group is created every 100 blocks.

In detail, when the local node recognizes that the current time satisfies the preset time value for creating the synchronizing groups in the local disposition data, the transaction request for creating the synchronizing group is initiated. For example, the preset time value is every 10 minutes, and when the local node recognizes that a difference between the current time and the previous time for creating the synchronizing groups is equal to 10 minutes, the transaction request for creating the synchronizing group is initiated; or when the local node recognizes that the current block height satisfies the preset interval of the block heights created by the synchronizing group in the local disposition data, the transaction request for creating the synchronizing group is initiated. For example, the preset interval of the block heights is 100 blocks between an end block of the previous synchronizing group and the current block, and when the local node recognizes that the current block height satisfies the preset interval of the block heights, the transaction request for creating the synchronizing group is initiated; or when the current time and the current block height respectively satisfy the preset time value and the preset interval of the block heights created by the synchronizing group in the local disposition data, the transaction request for creating the synchronizing group is initiated.

It should be noted that, the local node in this embodiment is the node generated by the current block or a node specially used for supervising the creation for the synchronizing group.

At step S220, based on the transaction request for creating the synchronizing group, one or more sequential blocks from a first block to a current block is determined as one or more synchronizing blocks of the synchronizing group.

At step S230, a synchronizing signature of the synchronizing group is determined based on the one or more synchronizing blocks At step S240, the synchronizing signature as transaction data is recorded in the current block.

With the technical solution provided by embodiments of the present disclosure, the node of the blockchain adds the creation rule of the synchronizing group to the local disposition data when joining the blockchain network, thereby ensuring a sequence of the creation for the synchronizing group and rationality of operation of the blockchain network. When the node of the blockchain recognizes that the current state of the blockchain satisfies the rule for creating the synchronizing groups, the transaction request for creating the synchronizing group may be initiated automatically, to provide a new idea for the transaction request for creating the synchronizing group.

Embodiment 3

Figure 3:
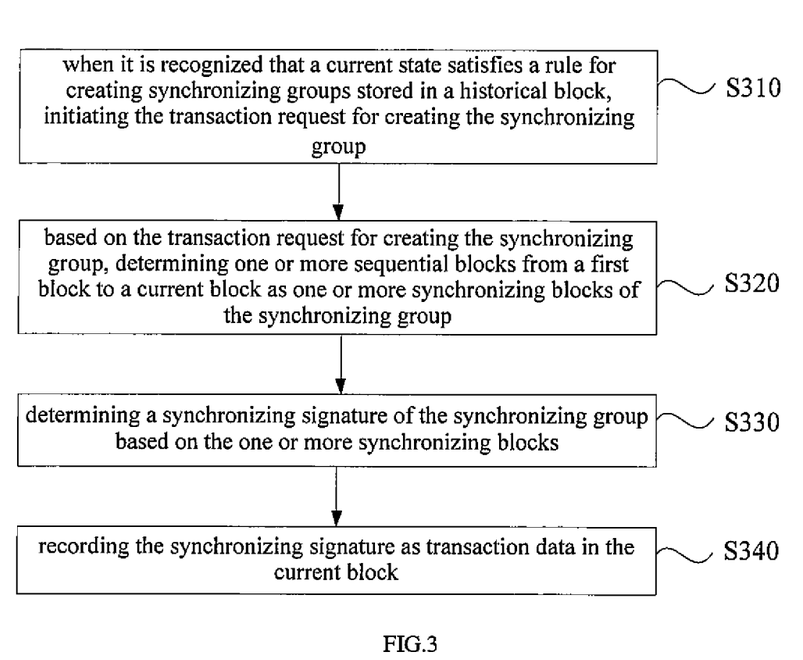
FIG. 3 is a flow chart illustrating a data processing method for a blockchain provided in Embodiment 3 of the present disclosure.

FIG. 3 is a flow chart illustrating a data processing method for a blockchain provided in Embodiment 3 of the present disclosure. This embodiment provides a way for obtaining a transaction request for creating a synchronizing group based on the above embodiments. The technical solution of this embodiment is applicable to determine a rule for creating synchronizing groups in a way of a smart contract. Referring to FIG. 3, the method includes the followings.

At step S310, when it is recognized that a current state satisfies a rule for creating synchronizing groups stored in a historical block, the transaction request for creating the synchronizing group is initiated.

In this embodiment, the rule for creating the synchronizing groups as transaction data may be written into the block in the form of the smart contract or other form recognized by the blockchain network. Alternatively, the rule for creating the synchronizing groups may include at least one of: a current time satisfying a preset time value; and a current block height satisfying a preset interval of block heights In detail, the local node may traverse the history block to obtain the rule for creating the synchronizing groups, or the history block may set a trigger notification mechanism to notify the node generated by the current block to query and to obtain the rule for creating the synchronizing groups when storing the rule for creating the synchronizing groups. When the local node recognizes that the current state of the blockchain satisfies the rule for creating the synchronizing groups stored in the historical block, the transaction request for creating the synchronizing group is initiated.

At step S320, based on the transaction request for creating the synchronizing group, one or more sequential blocks from a first block to a current block is determined as one or more synchronizing blocks of the synchronizing group.

At step S330, a synchronizing signature of the synchronizing group is determined based on the one or more synchronizing blocks.

At step S340, the synchronizing signature is recorded as transaction data in the current block. With the technical solution provided by embodiments of the present disclosure, by storing the rule for creating the synchronizing groups in the block, the integrity and transparency of the rule for creating the synchronizing groups are ensured, and when the node of the blockchain recognizes that the current state of the blockchain satisfies the rule for creating the synchronizing groups, the transaction request for creating the synchronizing group is initiated automatically, to provide a new idea for obtaining the transaction request for creating the synchronizing group.

Exemplarily, obtaining the transaction request for creating the synchronizing group may also by following ways.

1) When a requirement for using the synchronizing group is generated, the transaction request for creating the synchronizing group is initiated.

The requirement for using the synchronizing group refers to a requirement generated when the synchronizing group needs to be used. The requirement for using the synchronizing group may include one or more blocks included in the required synchronizing group. Alternatively, generating the requirement for using the synchronizing group may include: generating the requirement for using the synchronizing group when the blockchain needs to be synchronized locally; and may also include: generating the requirement for using the synchronizing group when data in the blockchain needs to be amended locally.

In detail, when the local node is a node newly added to the blockchain, or the local node is missing some or all of the blocks in the blockchain of the local node due to a communication quality, a malicious attack or other factors, the local node needs to synchronize the blockchain, thereby generating the requirement for using the synchronizing group locally. The local node may initiate the transaction request for creating the synchronizing group based on the requirement for using the synchronizing group. The local node may also send the requirement for using the synchronizing group to the node generated by the current block, or when the node generated by the current block detects that the local node generates the requirement for using the synchronizing group, the node generated by the current block initiates the transaction request for creating the synchronizing group.

2) The transaction request for creating the synchronizing group initiated by any node is received. Any node may be any node with the synchronizing requirement in the blockchain or any node with a super permission; and may also be the node generated by the current block. In detail, the local node may obtain the transaction request for creating the synchronizing group by receiving the transaction request for creating the synchronizing group initiated by any node in the blockchain in real time.

3) Any node in the blockchain initiates the transaction request for creating the synchronizing group when the synchronizing group needs to be used locally, and no matched synchronizing group is queried after traversing the blockchain.

The transaction request for creating the synchronizing group initiated by the above node may carry the rule for creating the synchronizing groups. The rule may stipulate a rule for creating the synchronizing groups at the current time, or may stipulate a rule for continuously creating the synchronizing groups subsequently, that is, the rule stored in a block as a rule for creating the synchronizing groups in a subsequent historical block.

Embodiment 4

Figure 4:
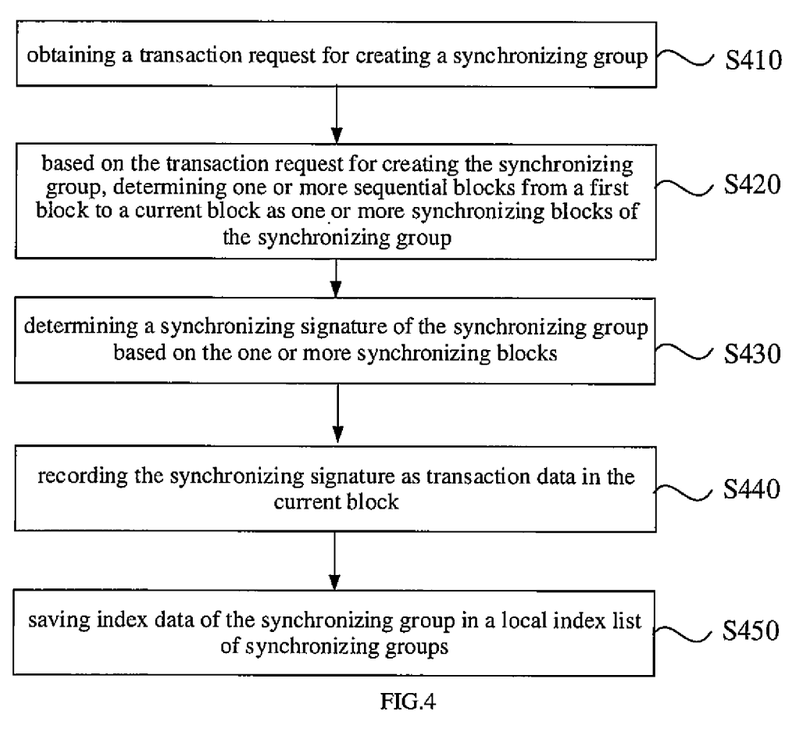
FIG. 4 is a flow chart illustrating a data processing method for a blockchain provided in Embodiment 4 of the present disclosure.

FIG. 4 is a flow chart illustrating a data processing method for a blockchain provided in Embodiment 4 of the present disclosure. This embodiment is further refined on the basis of the above embodiments. This embodiment provides an index way of a synchronizing group. Referring to FIG. 4, the method includes the followings.

At step S410, a transaction request for creating a synchronizing group is obtained.

At step S420, based on the transaction request for creating the synchronizing group, one or more sequential blocks from a first block to a current block are determined as one or more synchronizing blocks of the synchronizing group.

At step S430, a synchronizing signature of the synchronizing group is determined based on the one or more synchronizing blocks.

At step S440, the synchronizing signature as transaction data is recorded in the current block.

At step S450, index data of the synchronizing group is saved in a local index list of synchronizing groups.

The index data refers to data used to assist a node to quickly query information of the synchronizing group, and may include a marker of the synchronizing group, a marker of each synchronizing block constituting the synchronizing group, a synchronizing signature of the synchronizing group, a block marker where the synchronizing signature is located. The marker of the synchronizing group may be a number or name of the synchronizing group. The block marker refers to a marker used to uniquely identify or determine a certain block, and may be an ID (Identity document) or a serial number of the block.

An index list of synchronizing groups refers to a list that stores index data of different synchronizing groups in a certain order or rule. For example, the index data of different synchronizing groups may be stored based on the marker of the synchronizing group, and one synchronizing group may uniquely correspond to a row or a column in the index list of the synchronizing groups. Alternatively, the index list of the synchronizing groups may be dynamically updated such as adding, deleting or replacing according to the synchronizing group established in the blockchain.

In detail, after the local node receives the transaction request for creating the synchronizing group, and performs signature processing to verify the transaction data, mapping relationships among the synchronizing group, the synchronizing signature, and the synchronizing block are stored in the local index list of the synchronizing group Exemplarily, when the local node requires to query a certain synchronizing group, querying the required synchronizing group by one or more of:

1) querying the index data of the synchronizing group in the local index list of the synchronizing groups;

2) initiating a transaction request for querying the synchronizing group, and requesting a node generated by the current block to traverse the blockchain from back to front, to query the synchronizing group, in which, the transaction request for querying the synchronizing group refers to a request for querying the synchronizing groups, which may include the marker of the synchronizing group or the signature of the synchronizing group; and 3) sending the transaction request for querying the synchronizing group to each node trusted by the local node, and requesting each node to query the index data of the synchronizing group in the local index list of the synchronizing groups.

In detail, when the local node needs to use the synchronizing group to synchronize the blockchain, if the index list of the synchronizing group is stored in local, the local index list of the synchronizing group may be queried first. When there is a synchronizing group matching to the required synchronizing group, the index data of the matched synchronizing group may be directly obtained for synchronization operation. When there is no matched synchronizing group, the local node may initiate the transaction request for querying the synchronizing group to each node that the local node trusts, such that each node that the local node trusts may query the index data of the synchronizing group in the local index list of the synchronizing groups after receiving the transaction request for querying the synchronizing group. When the local node receives a feedback indicating no information being retrieved from each node that the local node trusts, the local node sends the transaction request for querying the synchronizing group to the node generated by the current block to request the node generated by the current block to traverse the blockchain forward from the current block to query the synchronizing group. When the node generated by the current block does not query the matched synchronizing group, the transaction request for creating the synchronizing group including the required synchronizing group may be initiated.

It should be noted that, the above ways for querying the required synchronizing group may be performed independently, and may also query in local firstly, i.e., the first way, and then send the transaction request for querying the synchronizing group, i.e., the second way and the third way.

With the technical solution provided by embodiments of the present disclosure, after the synchronizing group is established and the synchronizing signature of the synchronizing group is stored in the block, the node in the blockchain may maintain the index list of the synchronizing group in local and store the index data of the synchronizing group in the local index list of the synchronizing group, which provides convenience for subsequent query, verification and synchronization data.

Embodiment 5

Figure 5:
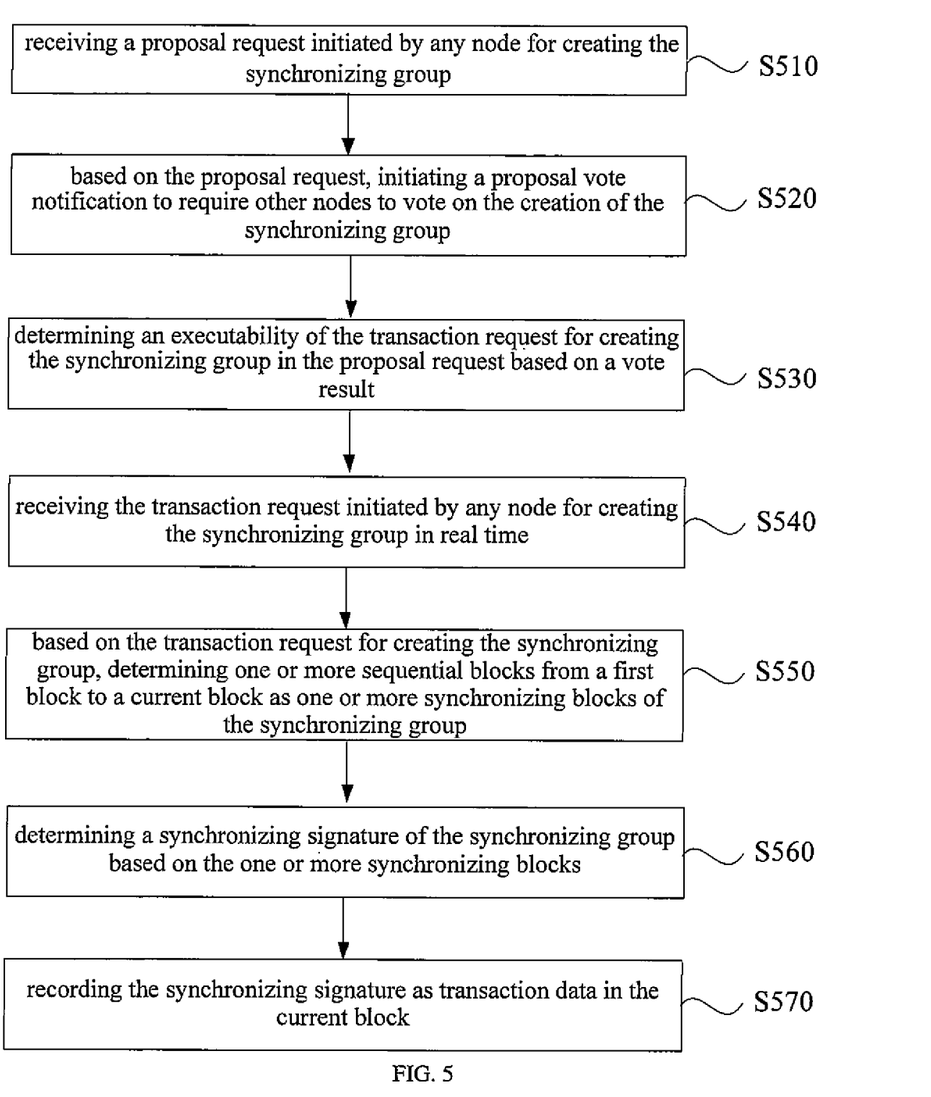
FIG. 5 is a flow chart illustrating a data processing method for a blockchain provided in Embodiment 5 of the present disclosure.

FIG. 5 is a flow chart illustrating a data processing method for a blockchain provided in Embodiment 5 of the present disclosure. On the basis of the above embodiments, this embodiment further refines a way for a local node obtaining a transaction request for creating a synchronizing group by receiving a transaction request initiated by any node for querying the synchronizing group. Referring to FIG. 5, the method may include the followings.

At step S510, a proposal request initiated by any node for creating the synchronizing group is received.

The proposal request refers to a proposal transaction request initiated by any node in the blockchain when needing to execute a certain transaction, such as a smart contract, and a node generated by a current block requests other nodes to feed back vote results. The proposal request may include at least one of: one or more synchronizing blocks constituting the synchronizing group and a signature way, or the proposal request may represent creation content of the synchronizing group based on a default mode. For example, the proposal request for creating the synchronizing group initiated currently indicates to create a synchronizing point in the current block.

At step S520, based on the proposal request, a proposal vote notification is initiated to require other nodes to vote on the creation of the synchronizing group.

At step S530, an executability of the transaction request for creating the synchronizing group in the proposal request is determined based on a vote result.

The node generated by the current block may determine the vote result based on a vote proportion. The vote proportion may be set by default or stipulated by the proposal request for creating the synchronizing group.

At step S540, the transaction request initiated by any node for creating the synchronizing group in real time is received.

In detail, after it is determined that the transaction request for creating the synchronizing group in the proposal request is recognized, an associated transaction request for creating the synchronizing group may be received. The transaction request for creating the synchronizing group may be generally carried in the proposal request for creating the synchronizing group.

At step S550, based on the transaction request for creating the synchronizing group, one or more sequential blocks from a first block to a current block is determined as one or more synchronizing blocks of the synchronizing group.

At step S560, a synchronizing signature of the synchronizing group is determined based on the one or more synchronizing blocks.

At step S570, the synchronizing signature as transaction data is recorded in the current block.

With the technical solution provided by embodiments of the present disclosure, before the transaction request for creating the synchronizing group is obtained, voting is performed on the proposal request of creating the synchronizing group firstly based on the consensus mechanism of blockchain network, and then a subsequent procedure for creating the synchronizing group is executed after it is determined that the transaction request for creating the synchronizing group in the proposal request is recognized.

Embodiment 6

Figure 6:
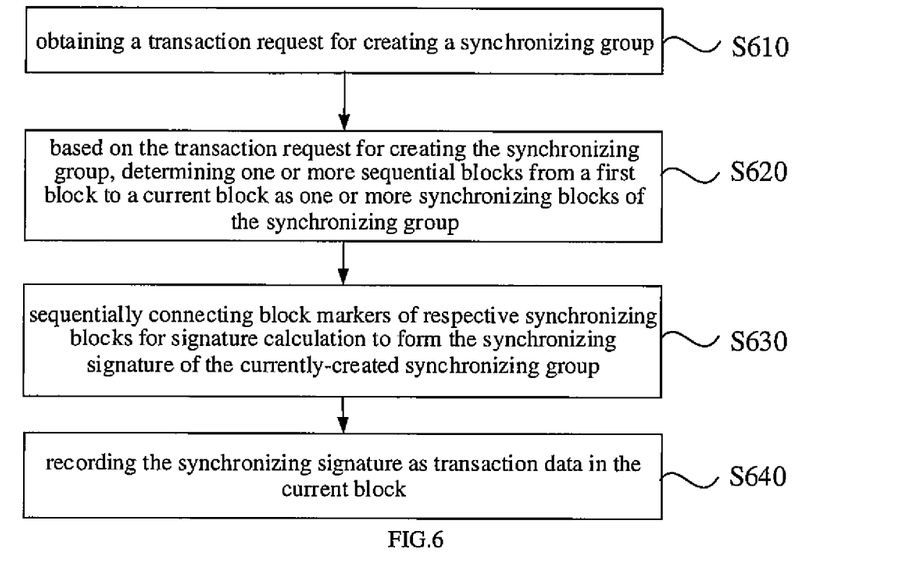
FIG. 6 is a flow chart illustrating a data processing method for a blockchain provided in Embodiment 6 of the present disclosure.

FIG. 6 is a flow chart illustrating a data processing method for a blockchain provided in Embodiment 6 of the present disclosure. This embodiment provides a way for determining a synchronizing signature of a synchronizing group based on one or more synchronizing blocks on the basis of the above embodiments. Referring to FIG. 6, the method includes the followings.

At step S610, a transaction request for creating a synchronizing group is obtained.

At step S620, based on the transaction request for creating the synchronizing group, one or more sequential blocks from a first block to a current block is determined as one or more synchronizing blocks of the synchronizing group.

At step S630, block markers of respective synchronizing blocks for signature calculation are sequentially connected, to form the synchronizing signature of the currently-created synchronizing group.

In detail, after the one or more synchronizing blocks of the synchronizing group are determined based on the transaction request for creating the synchronizing group, the local node obtains the block markers of the one or more synchronizing blocks from a block head of each synchronizing block, connects the block markers of respective synchronizing blocks together as a whole marker based on a number sequence of respective synchronizing blocks, and performs signature on the whole marker by employing a signature way specified in the transaction request for creating the synchronizing group, a public key of the local node, a private key or a signature algorithm such as SHA256, to form the synchronizing signature of the currently-created synchronizing group.

In order to further improve the security of the synchronizing signature and to increase the complexity of the synchronizing signature, exemplarily, determining the synchronizing signature of the synchronizing group based on the one or more synchronizing blocks may include: establishing a Merkle tree by employing the block markers of respective synchronizing blocks, and taking a root of the Merkle tree as the synchronizing signature. In detail, after the one or more synchronizing blocks of the synchronizing group is determined based on the transaction request for creating the synchronizing group, the local node obtains the block markers of the one or more synchronizing blocks from the block heads of respective synchronizing blocks, generates the Merkle tree by employing a Merkle tree algorithm based on the block markers of respective synchronizing blocks, and takes the root of the Merkle tree as the synchronizing signature of the synchronizing group.

In addition, in order to further improve the security of the synchronizing signature, to increase the credibility of the synchronizing signature, and to reduce a fraud probability of the local node, exemplarily, determining the synchronizing signature of the synchronizing group based on the one or more synchronizing blocks may include: determining the synchronizing signature of the synchronizing group based on the one or more synchronizing blocks and associating information, in which, the associating information includes at least one of creator information and creating time information.

The creator information refers to node information for creating the synchronizing group, such as a node marker. The creating time information refers to a local timestamp at which the local node creates the synchronizing group.

In detail, the local node may string the block markers of respective synchronizing blocks sequentially as the whole marker, add the creator information and the creating time information to the whole marker to form a new whole marker, and perform signature on the new whole marker, to form the synchronizing signature of the currently-created synchronizing group. The local node may also take the root of the Merkle tree, the creator information and the creating time information together as the synchronizing signature of the currently-created synchronizing group after generating the Merkle tree by employing the Merkle tree algorithm based on the block markers of respective synchronizing blocks.

At step S640, the synchronizing signature as transaction data in the current block is recorded.

In detail, the node generated by the current block records the synchronizing signature as the transaction data in the current block, and sends the current block to other nodes for verification. Other nodes obtain the creating time information from the synchronizing signature firstly after receiving the current block sent by the local node, and compares the creating time information with a current local time of the local node. When a time difference is not within a preset time threshold, the local node may be in a fraudulent phenomenon, and a procedure for verifying a subsequent synchronizing signature may not be performed, and verification failure information may be directly fed back. When the time difference is within a preset time threshold, other nodes may calculate the synchronizing signature of the synchronizing group in the same way as the local node. When the calculated synchronizing signature is consistent with the synchronizing signature in the current block, it is determined that the current block is valid, and the current block is stored in the blockchain; otherwise, block failure information including the marker of the current block is sent to other nodes in the blockchain.

With the technical solution provided by embodiments of the present disclosure, different synchronizing signature algorithms are employed to determine the synchronizing signature of the synchronizing group based on the synchronizing block and an actual condition, such that the use of the synchronizing signature is more flexible. Moreover, the synchronizing signature is determined according to the one or more synchronizing blocks, which indirectly indicates that the synchronizing signature follows a certain rule and also indirectly indicates the correlation among the synchronizing block, the synchronizing group and the synchronizing signature, thereby bringing convenience to subsequently query the synchronizing group.

Embodiment 7

Figure 7:
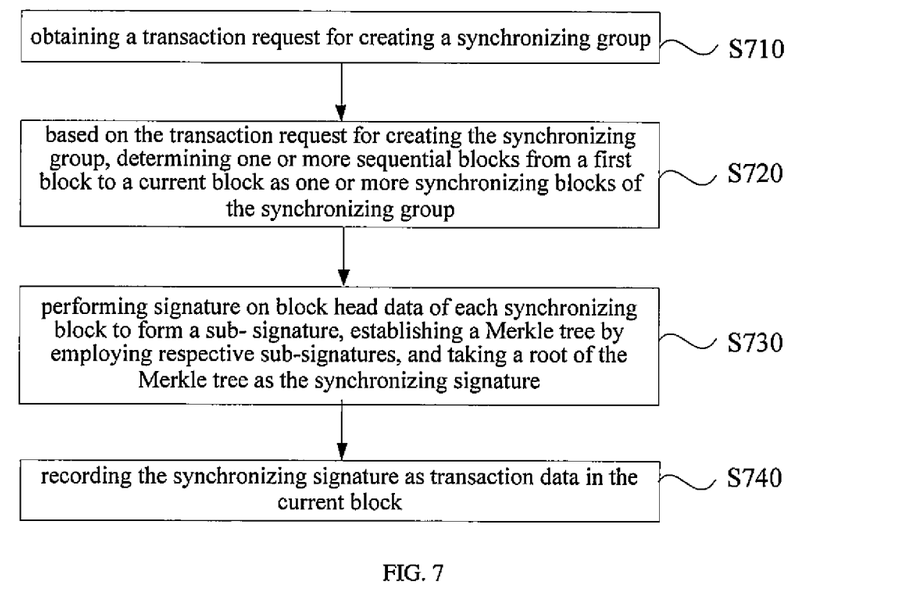
FIG. 7 is a flow chart illustrating a data processing method for a blockchain provided in Embodiment 7 of the present disclosure.

FIG. 7 is a flow chart illustrating a data processing method for a blockchain provided in Embodiment 7 of the present disclosure. This embodiment also provides a way for determining a synchronizing signature of a synchronizing group based on one or more synchronizing blocks on the basis of the above embodiments. Referring to FIG. 7, the method includes the followings.

At step S710, a transaction request for creating a synchronizing group is obtained.

At step S720, based on the transaction request for creating the synchronizing group, one or more sequential blocks from a first block to a current block are determined as one or more synchronizing blocks of the synchronizing group.

At step S730, signature is performed on block head data of each synchronizing block to form a sub-signature, a Merkle tree is established by employing respective sub-signatures, and a root of the Merkle tree is taken as the synchronizing signature.

The block head data may include a previous block marker, a timestamp created by the block, a random number, a target hash, a Mekel root created by the transaction data within the block. The sub-signature may be a hash signature.

In detail, after the one or more synchronizing blocks of the synchronizing group are determined based on the transaction request for creating the synchronizing group, the local node may obtain the block head data of each synchronizing block from each synchronizing block, and perform sub-signature on the block head data of each synchronizing block by employing a signature way such as the hash signature. Based on each sub-signature, the Mekel tree is generated by employing a Mekel tree algorithm, and the root of the Mekel tree is taken as the synchronizing signature of the synchronizing group.

In order to further improve the security of the synchronizing signature, to increase the credibility of the synchronizing signature, and to reduce a fraud probability of the local node, exemplarily, determining the synchronizing signature of the synchronizing group based on the one or more synchronizing blocks may also include: determining the synchronizing signature of the synchronizing group based on the one or more synchronizing blocks and associating information, in which, the associating information includes at least one of creator information and creating time information. The creator information refers to node information for creating the synchronizing group, such as a node marker. The creating time information refers to a local timestamp at which the local node creates the synchronizing group.

In detail, the local node performs signature on the block head data of each synchronizing block to form the sub-signature, and take the root of the Merkle tree, the creator information and the creating time information together as the synchronizing signature of the currently-created synchronizing group after generating the Merkle tree by employing the Merkle tree algorithm based on each sub-signature.

At step S740, the synchronizing signature as transaction data is recorded in the current block.

With the technical solution provided by embodiments of the present disclosure, the signature is performed on the block head data of each synchronizing block to form the sub-signature, the Merkle tree algorithm is employed to calculate respective sub-signatures to generate the Merkle tree, and the root of the Merkle tree is taken as the synchronizing signature. By increasing the complexity of the synchronizing signature, the security of the synchronizing signature is further improved and the credibility of the synchronizing signature is increased.

Exemplarily, determining the synchronizing signature of the synchronizing group based on the one or more synchronizing blocks may also include: performing signature calculation according to the one or more synchronizing blocks of the currently-created synchronizing group and at least one of synchronizing signatures in existed synchronizing groups, to form the synchronizing signature of the currently-created synchronizing group.

In detail, after the one or more synchronizing blocks of the currently-created synchronizing group are determined, the local node may query from a local index list of the synchronizing groups and obtain the synchronizing signatures in existed synchronizing groups included in the currently-created synchronizing group. For example, when the synchronizing blocks included in the currently-created synchronizing group are blocks from the 0-th block to the 300-th block, an existed synchronizing group 1 includes blocks from the 0-th block to the 100-th block, and an existed synchronizing group 2 includes blocks from the 0-th block to the 200-th block, the local node may perform signature in combination with the synchronizing signatures of the synchronizing group 1, the synchronizing signatures of the synchronizing group 2, and the synchronizing blocks of the current synchronizing group, to form the synchronizing signature of the currently-created synchronizing group. The signature way employed in this embodiment enables respective synchronizing groups are related, but not isolated.

Embodiment 8

Figure 8:
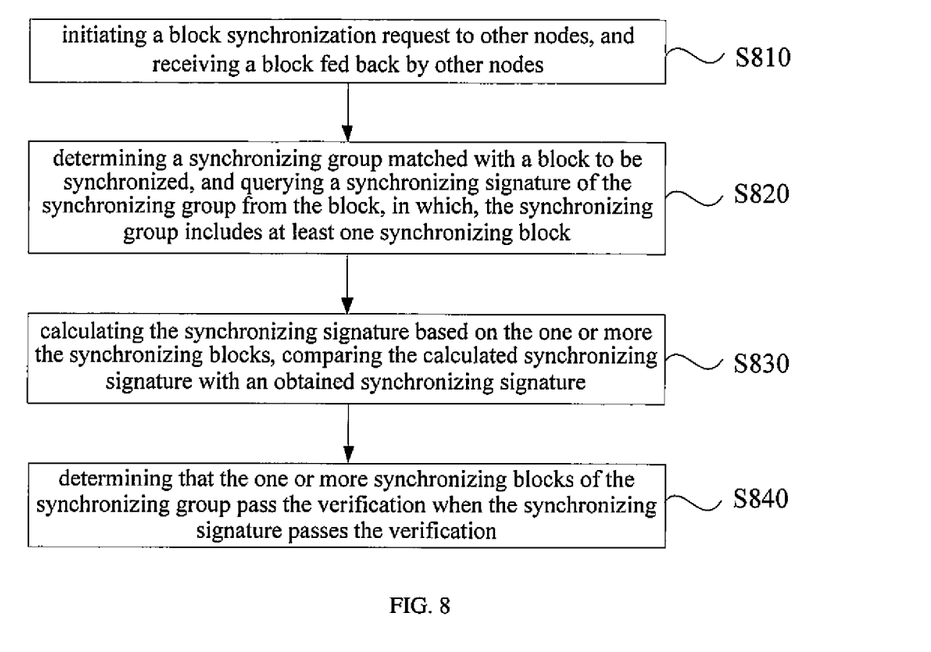
FIG. 8 is a flow chart illustrating a data verification method for a blockchain provided in Embodiment 8 of the present disclosure.

FIG. 8 is a flow chart illustrating a data verification method for a blockchain provided in Embodiment 8 of the present disclosure. The embodiment provides a data verification method when there is a synchronizing group in a blockchain. The method is applicable to a solution for a scene where any node performs data synchronization from other nodes in a blockchain network. The synchronizing group may be created in the manner of the above embodiments. The solution of this embodiment is implemented by a data verification apparatus of the blockchain. The apparatus may be implemented in software and/or hardware, and may be generally configured in an electronic device of a node of the blockchain. Referring to FIG. 8, the method includes the followings.

At step S810, a block synchronization request is initiated to other nodes, and a block fed back by other nodes is received.

In this embodiment, when the block synchronization request is generated, the block synchronization request may be initiated to other nodes, to download synchronizing block data. Other node may be any node storing the blockchain, preferably, a node trusted by a local node. The block synchronization request refers to a requirement generated when the nodes in the blockchain need to synchronize block data. The block synchronization request may include a block marker of a required synchronizing block.

Alternatively, generating the block synchronization request may include at least one of: 1) generating a block synchronization request for obtaining a complete blockchain when it is determined that the local node is a node newly added to the blockchain network; 2) generating a block synchronization request when the local node loses some or all of the blocks in the blockchain of the local node due to a communication quality or other factors such as a malicious attack, and the blockchain needs to be downloaded synchronously; 3) generating a block synchronization request of a block to be queried based on a query request for the block data; and 4) generating a block synchronization request of the block to be verified based on a verification request for the block data.

The local node sends the block synchronization request to other nodes in the blockchain network. After the block synchronization request sent by the local node is received, other nodes obtain block data of a corresponding synchronizing group and feed back the block data to the local node. The local node receives the block data of the corresponding synchronizing group fed back by other nodes, and saves the block data in local.

At step S820, a synchronizing group matched with a block to be synchronized is determined, and a synchronizing signature of the synchronizing group is queried from the block, in which, the synchronizing group includes at least one synchronizing block.

In detail, the local node may query the synchronizing group in the index list maintained locally or the blockchain according to the block marker to be synchronized and included in the block synchronization request. When a matched synchronizing group is queried, the matched synchronizing group is determined as the synchronizing group of the block to be synchronized. When no matched synchronizing group is queried, a transaction request for creating the synchronizing group may be sent to the blockchain network to request the blockchain network to create the synchronizing group, thereby obtaining the synchronizing group. The index list maintained locally may be added with information of the synchronizing group for querying when the synchronizing group is created.

Alternatively, the method may also include: initiating the transaction request for creating the synchronizing group when it is determined that there is no matched synchronizing group.

The local node may obtain the synchronizing signature of the synchronizing group from the block based on the synchronizing group after determining the synchronizing group where the block to be synchronized locates.

The above sequence for operating actions at S810 and S820 is not limited. The block synchronization request may be initiated first, to receive the synchronized block data from other nodes, and then the corresponding synchronizing group is matched to obtain the synchronizing signature.

At step S830, the synchronizing signature is calculated based on the one or more the synchronizing blocks, the calculated synchronizing signature is compared with an obtained synchronizing signature.

The synchronizing block refers to one or more blocks constituting the synchronizing group, and each synchronizing group includes at least one synchronizing block. Alternatively, synchronizing signature ways for obtaining the synchronizing group are different, and ways that the local node calculates the synchronizing signature based on the synchronizing block are different.

In detail, the local node may calculate the synchronizing signature of the synchronizing group based on the one or more synchronizing blocks, compare the calculated synchronizing signature with the synchronizing signature obtained from the block. When the two synchronizing signatures are the same, it is determined that the synchronizing signature passes the verification; otherwise, it is determined that the synchronizing signature does not pass the verification.

At step S840, it is determined that the one or more synchronizing blocks of the synchronizing group pass the verification when the synchronizing signature passes the verification.

In detail, when the synchronizing signature of the synchronizing group passes the verification, it is determined that the one or more synchronizing blocks of the synchronizing group pass the verification; and when the synchronizing signature does not pass the verification, it is determined that the one or more synchronizing blocks of the synchronizing group does not pass the verification.

It should be noted that, the verification function of the block marker of each synchronizing block is directly replaced by the verification of the synchronizing signature employed in this embodiment, or a verification priority of the synchronizing signature may be set higher than that of each synchronizing block. When the block data is used for synchronization, the synchronizing group is taken as a unit, and there is no need to verify the block marker of each synchronizing block one by one by, thereby simplifying the verification procedure. In addition, since the synchronizing signature is recorded in the block, recognition and effective supervision of other nodes may be obtained, and the block data may be prevented from being tampered with.

The above solution may include: when it is determined that at least one of the blocks to be synchronized does not have a matched synchronizing group, verification is performed based on a block marker of the block which is not matched. For example, when there are 920 blocks to be synchronized, a synchronizing point is formed at the 900th block, the 0th to 900th blocks belong to one synchronizing group, and the last 20 blocks do not belong to any synchronizing group, the synchronizing blocks belonging to the synchronizing group may be verified based on the synchronizing signature, and the block not belonging to the synchronizing group may still be verified based on the marker of each block itself.

With the technical solution provided by embodiments of the present disclosure, when the local node needs to use the block data for synchronization, the local node only needs to compare and to verify the synchronizing signature calculated based on the one or more synchronizing blocks with the synchronizing signature obtained from the block, without verifying the block marker of each synchronizing block one by one. Compared with the existing verification method for the block data, the verification method for the block data is optimized, the verification procedure is simplified, and data synchronization is accelerated.

Embodiment 9

Figure 9:
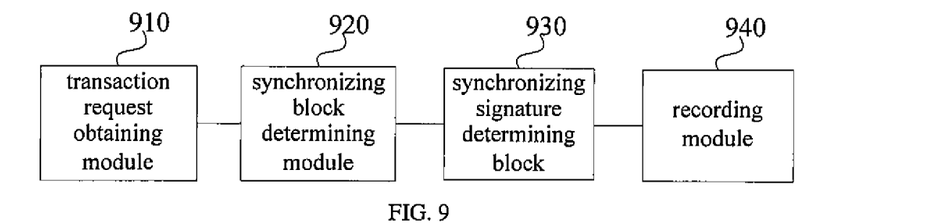
FIG. 9 is a block diagram illustrating a data processing apparatus for a blockchain provided in Embodiment 9 of the present disclosure.

FIG. 9 is a block diagram illustrating a data processing apparatus for a blockchain provided in Embodiment 9 of the present disclosure. The apparatus may be configured in a node of the blockchain, execute a data processing method for a blockchain provided by any one of embodiments of the present disclosure, and have function modules and advantageous effects corresponding to the execution method. As illustrated in FIG. 9, the apparatus includes: a transaction request obtaining module 910, a synchronizing block determining module 920, a synchronizing signature determining block 930, and a recording module 940.

The transaction request obtaining module 910 is configured to obtain a transaction request for creating a synchronizing group. The synchronizing block determining module 920 is configured to, based on the transaction request for creating the synchronizing group, determine one or more sequential blocks from a first block to a current block as one or more synchronizing blocks of the synchronizing group. The synchronizing signature determining block 930 is configured to determine a synchronizing signature of the synchronizing group based on the one or more synchronizing blocks. The recording module 940 is configured to record the synchronizing signature as transaction data in the current block.

With the technical solution provided by embodiments of the present disclosure, after the transaction request for creating the synchronizing group is obtained, the synchronizing group is constructed based on the transaction request for creating the synchronizing group, the synchronizing signature of the synchronizing group is determined based on the one or more synchronizing blocks constructing the current synchronizing group, and the synchronizing signature as transaction data is recorded in the current block, thereby reducing the probability that the synchronizing signature is falsified. When any node in the blockchain wants to obtain the block data, the block data may be verified by taking the synchronizing group as a unit, which provides a new idea for the node in the blockchain to verify the blockchain data, and optimizes the verification method for the block data. When the method is performed in a scene for synchronizing the block data, a plurality of synchronizing blocks may be verified at one time, thereby accelerating data synchronizing.

Exemplarily, the transaction request obtaining module 910 is configured to execute at least one of: when it is recognized that a current state satisfies a rule for creating synchronizing groups in local disposition data, initiating the transaction request for creating the synchronizing group; when it is recognized that a current state satisfies a rule for creating synchronizing groups stored in a historical block, initiating the transaction request for creating the synchronizing group; receiving the transaction request for creating the synchronizing group initiated by any node; and when a requirement for using synchronizing groups is generated, initiating the transaction request for creating the synchronizing group.

It should be noted that, the rule for creating synchronizing groups includes at least one of: a current time satisfying a preset time value; and a current block height satisfying a preset interval of block heights.

Exemplarily, the above apparatus also includes: a saving module, configured to save index data of the synchronizing group in a local index list of synchronizing groups after recording the synchronizing signature as the transaction data in the block.

Exemplarily, the above apparatus also includes: a query module, configured to query the index data of the synchronizing group in the local index list of synchronizing groups; or to initiate a transaction request for querying the synchronizing group, and to request a node generated by the current block to traverse the blockchain from back to front, to query the synchronizing group.

Exemplarily, the synchronizing signature determining block 930 is configured to execute at least one of: sequentially connecting block markers of respective synchronizing blocks for signature calculation to form the synchronizing signature of the currently-created synchronizing group; establishing a Merkle tree by employing the block markers of respective synchronizing blocks, and taking a root of the Merkle tree as the synchronizing signature; performing signature on block head data of each synchronizing block to form a sub-signature, establishing a Merkle tree by employing respective sub-signatures, and taking a root of the Merkle tree as the synchronizing signature; and performing signature calculation according to the one or more synchronizing blocks of the currently-created synchronizing group and at least one of synchronizing signatures in existed synchronizing groups, to form the synchronizing signature of the currently-created synchronizing group.

Exemplarily, the synchronizing signature determining block 930 is also configured to determine the synchronizing signature of the synchronizing group based on the one or more synchronizing blocks and associating information, in which, the associating information includes at least one of creator information and creating time information.

Exemplarily, the recording module 940 is configured to record the synchronizing signature as the transaction data in the current block based on a node generated by the current block; and to send the current block to other nodes for verification.

Embodiment 10

Figure 10:
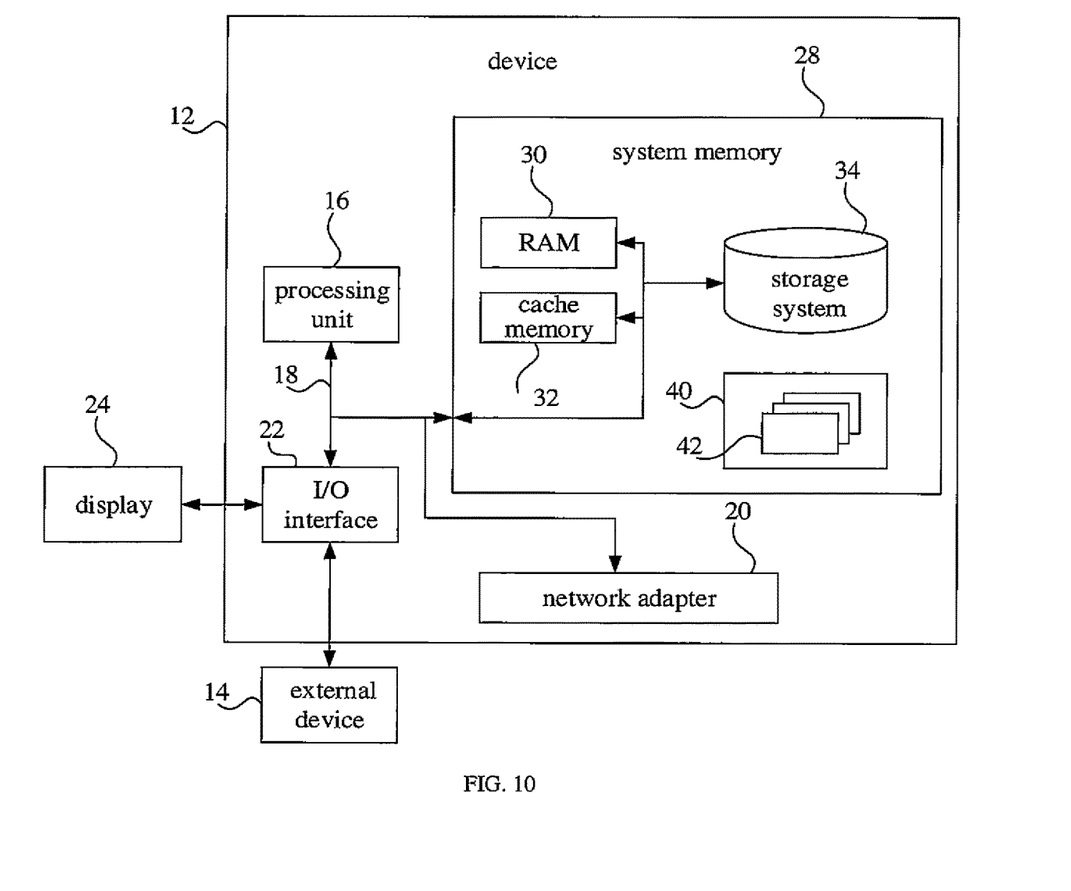
FIG. 10 is a block diagram illustrating a device provided in Embodiment 10 of the present disclosure.

FIG. 10 is a block diagram illustrating a device provided in Embodiment 10 of the present disclosure. FIG. 10 illustrates a block diagram of an exemplary device 12 applicable to implement implementations of the present disclosure. The device 12 illustrated in FIG. 10 is only an example, which may not bring any limitation to functions and scope of embodiments of the present disclosure. In this embodiment, the device 12 may typically be a computing device that undertakes a function of a blockchain network node.

As illustrated in FIG. 10, the device 12 is presented in form of a general-purpose computing device. Components of the device 12 may include but be not limited to: one or more processors or processing units 16, a system memory 28, and a bus 18 connecting different system components (including the system memory 28 and the processor 16).

The bus 18 represents one or more of several bus structures, including a storage bus or a local bus with any bus structure in the plurality of bus structures and being employed by a storage controller, a peripheral bus, an accelerated graphics port and a processor. For example, these architectures include, but are not limited to, an industry standard architecture (ISA) bus, a micro channel architecture (MCA) bus, an enhanced ISA bus, a video electronics standards association (VESA) local bus and a peripheral component interconnection (PCI) bus.

The device 12 typically includes a plurality of computer system readable mediums. These mediums may be any usable medium that may be accessed by the device 12, including volatile and non-volatile mediums, removable and non-removable mediums.

The system memory 28 may include computer system readable mediums in the form of volatile medium, such as a random-access memory (RAM) 30 and/or a cache memory 32. The device 12 may further include other removable/non-removable, volatile/non-volatile computer system storage mediums. Only as an example, the storage system 34 may be configured to read from and write to non-removable, non-volatile magnetic mediums (not illustrated in FIG. 10, and usually called "a hard disk driver"). Although not illustrated in FIG. 10, a magnetic disk driver configured to read from and write to the removable non-volatile magnetic disc (such as "a diskette"), and an optical disc driver configured to read from and write to a removable non-volatile optical disc (such as a compact disc-read only memory (CD-ROM), a digital video disc-read only memory (DVD-ROM) or other optical mediums) may be provided. Under these circumstances, each driver may be connected to the bus 18 by one or more data medium interfaces. The system memory 28 may include at least one program product. The program product has a set of program modules (such as, at least one program module), and these program modules are configured to execute functions of respective embodiments of the present disclosure.

A program/utility tool 40, having a set (at least one) of program modules 42, may be stored in the system memory 28. Such program modules 42 include, but not are limited to, an operating system, one or more application programs, other program modules, and program data. Each or any combination of these examples may include an implementation of a network environment. The program module 42 usually executes functions and/or methods described in embodiments of the present disclosure.

The device 12 may communicate with one or more external devices 14 (such as a keyboard, a pointing device, and a display 24), may also communicate with one or more devices enabling a user to interact with the device 12, and/or may communicate with any device (such as a network card, and a modem) enabling the device 12 to communicate with one or more other computing devices. Such communication may occur via an input/output (I/O) interface 22. Moreover, the device 12 may further communicate with one or more networks (such as local area network (LAN), wide area network (WAN) and/or public network, such as Internet) via a network adapter 20. As illustrated in FIG. 10, the network adapter 20 communicates with other modules of the device 12 via the bus 18. It should be understood that, although not illustrated in FIG. 10, other hardware and/or software modules may be used in combination with the device 12, including but being not limited to: microcode, device drivers, redundant processing units, external disk drive arrays, RAID (redundant array of independent disks) systems, tape drives, and data backup storage systems, etc.

The processor 16, by operating programs stored in the system memory 28, executes various function applications and data processing, for example implements a data processing method for a blockchain provided in embodiments of the present disclosure.

Embodiment 11

Embodiment 11 of the present disclosure also provides a computer readable storage medium having a computer program stored thereon. The computer program is configured to implement the data processing method for the blockchain according to embodiments of the present disclosure when executed by a computer processor. The computer readable storage medium may be configured in a node of the blockchain.

The computer storage medium in embodiments of the present disclosure may employ any combination of one or more computer readable mediums. The computer readable medium may be a computer readable signal medium or a computer readable storage medium. The computer readable storage medium may be, such as, but not limited to an electronic, magnetic, optical, electromagnetic, infrared, or semiconductor system, apparatus or device, or any suitable combination of the foregoing. More specific examples (a non-exhaustive list) of the computer readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium may be any tangible medium that contains or stores a program. The program may be used by or in conjunction with an instruction execution system, apparatus or device.

The computer readable signal medium may include a data signal transmitted in the baseband or as a part of a carrier, in which computer readable program codes are carried. The transmitted data signal may employ a plurality of forms, including but not limited to, an electromagnetic signal, a light signal or any suitable combination thereof. The computer readable signal medium may further be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet service provider).

Although a specific illumination is made to the present disclosure by the above embodiments, the present disclosure is not merely limited to the above embodiments. More other equivalent embodiments may also be included without departing from the technical idea of the present disclosure. The scope of the present disclosure is determined by the appended claims.

What is claimed is:

1. A data processing method for a blockchain, applied to a node of the blockchain, and comprising:
   obtaining a transaction request for creating a synchronizing group;
   based on the transaction request for creating the synchronizing group, determining one or more sequential blocks from a first block to a current block as one or more synchronizing blocks of the synchronizing group;
   determining a synchronizing signature of the synchronizing group based on the one or more synchronizing blocks; and
   recording the synchronizing signature as transaction data in the current block;
   wherein obtaining the transaction request for creating the synchronizing group comprises at least one of:
   when it is recognized that a current state satisfies a rule for creating synchronizing groups in local disposition data, initiating the transaction request for creating the synchronizing group;
   when it is recognized that a current state satisfies a rule for creating synchronizing groups stored in a historical block, initiating the transaction request for creating the synchronizing group;
   receiving the transaction request for creating the synchronizing group initiated by any node; and
   when a requirement for using synchronizing groups is generated, initiating the transaction request for creating the synchronizing group.

2. The method of claim 1, wherein the rule for creating synchronizing groups comprises at least one of:
   a current time satisfying a preset time value; and
   a current block height satisfying a preset interval of block heights.

3. The method of claim 1, after recording the synchronizing signature as the transaction data in the block, further comprising:
   saving index data of the synchronizing group in a local index list of synchronizing groups.

4. The method of claim 3, further comprising:
   querying the index data of the synchronizing group in the local index list of synchronizing groups.

5. The method of claim 3, further comprising:
   initiating a transaction request for querying the synchronizing group, and requesting a node generated by the current block to traverse the blockchain from back to front, to query the synchronizing group.

6. The method of claim 1, wherein determining the synchronizing signature of the synchronizing group based on the one or more synchronizing blocks comprises at least one of:
   sequentially connecting block markers of respective synchronizing blocks for signature calculation to form the synchronizing signature of the currently-created synchronizing group;
   establishing a Merkle tree by employing the block markers of respective synchronizing blocks, and taking a root of the Merkle tree as the synchronizing signature;
   performing signature on block head data of each synchronizing block to form a sub-signature, establishing a Merkle tree by employing respective sub-signatures, and taking a root of the Merkle tree as the synchronizing signature; and
   performing signature calculation according to the one or more synchronizing blocks of the currently-created synchronizing group and at least one of synchronizing signatures in existed synchronizing groups, to form the synchronizing signature of the currently-created synchronizing group.

7. The method of claim 6, wherein determining the synchronizing signature of the synchronizing group based on the one or more synchronizing blocks comprises:
   determining the synchronizing signature of the synchronizing group based on the one or more synchronizing blocks and associating information, in which, the associating information comprises at least one of creator information and creating time information.

8. The method of claim 1, wherein recording the synchronizing signature as the transaction data in the current block comprises:

recording the synchronizing signature as the transaction data in the current block based on a node generated by the current block; and sending the current block to other nodes for verification.

9. A data processing apparatus for a blockchain, comprising:

one or more processors;

a memory storing instructions executable by the one or more processors;

wherein the one or more processors are configured to:

obtain a transaction request for creating a synchronizing group;

based on the transaction request for creating the synchronizing group, determine one or more sequential blocks from a first block to a current block as one or more synchronizing blocks of the synchronizing group;

determine a synchronizing signature of the synchronizing group based on the one or more synchronizing blocks; and record the synchronizing signature as transaction data in the current block;

wherein the transaction request for creating the synchronizing group is obtained by performing at least one of:

when it is recognized that a current state satisfies a rule for creating synchronizing groups in local disposition data, initiating the transaction request for creating the synchronizing group;

when it is recognized that a current state satisfies a rule for creating synchronizing groups stored in a historical block, initiating the transaction request for creating the synchronizing group;

receiving the transaction request for creating the synchronizing group initiated by any node; and when a requirement for using synchronizing groups is generated, initiating the transaction request for creating the synchronizing group.

10. A non-transitory medium having a computer program stored thereon, wherein when the computer program is executed by a processor, the processor is caused to implement a data processing method for a blockchain, and the method comprises:

obtaining a transaction request for creating a synchronizing group;

based on the transaction request for creating the synchronizing group, determining one or more sequential blocks from a first block to a current block as one or more synchronizing blocks of the synchronizing group;

determining a synchronizing signature of the synchronizing group based on the one or more synchronizing blocks; and recording the synchronizing signature as transaction data in the current block;

wherein obtaining the transaction request for creating the synchronizing group comprises at least one of:

when it is recognized that a current state satisfies a rule for creating synchronizing groups in local disposition data, initiating the transaction request for creating the synchronizing group;

when it is recognized that a current state satisfies a rule for creating synchronizing groups stored in a historical block, initiating the transaction request for creating the synchronizing group;

receiving the transaction request for creating the synchronizing croup initiated by any node; and when a requirement for using synchronizing croups is generated, initiating the transaction request for creating the synchronizing group.

* * * * *